Aug. 8, 1950 W. GRONROS ET AL 2,518,308

ELECTRON DISCHARGE DEVICE UNIT MOUNTING

Filed Sept. 14, 1948 2 Sheets-Sheet 1

INVENTORS W. GRONROS
E. A. VEAZIE
BY R. J. Guenther
ATTORNEY

ELECTRON DISCHARGE DEVICE UNIT MOUNTING

Filed Sept. 14, 1948 2 Sheets-Sheet 2

INVENTORS W. GRONROS
E. A. VEAZIE
BY
ATTORNEY

Patented Aug. 8, 1950 2,518,308

UNITED STATES PATENT OFFICE 2,518,308

ELECTRON DISCHARGE DEVICE UNIT MOUNTING

Warren Gronros, Basking Ridge, and Edmund A. Veazie, Summit, N. J., assignors to Bell Telephone Laboratories Incorporated, New York, N. Y., a corporation of New York Application September 14, 1948, Serial No. 49,184

9 Claims. (Cl. 250—27.5)

This invention relates to electron discharge devices and more particularly to such devices employed in high fidelity amplifying systems.

In direct current amplifier systems the useful sensitivity is basically limited by drift in the plate current of the initial stage. While instability in later stages may be offset by negative feedback, reduction of that caused by the first stage is primarily a tube problem and cannot be offset by circuit refinements. Furthermore, it is desirable, for intermittent operation, when an amplifier is turned on, that the initial stage return to the precise condition existing immediately prior to shutdown.

Plate current drift may be due to a number of causes, such as variation in heater resistance, localized shift in temperature of the cathode, high grid current, and mechanical shifting of the components of the electrode assembly in the device.

The primary objects of this invention are to minimize instability in operation and to increase the useful range of direct current amplifier electronic devices.

Another object of the invention is to eliminate mechanical shifting in the position of the cathode in a unitary assembly of electrodes in the device.

A further object of the invention is to allow controlled expansion of a plurality of cathodes in multiple unit devices in a longitudinal direction during warm-up but to support the cathodes in constant relation during successive operating periods and to completely prevent lateral relative movement of the cathodes with respect to the mounting assembly.

Another object of the invention is to facilitate the mounting of the means controlling the cathodes so that positive pressure is realized in the assembly structure of the device.

These and other objects and advantages of the invention are achieved in a unitary electrode assembly of the multiunit type in which separate triode units are mounted between insulating spacer discs within an enclosing vessel. The separate cathodes, of the sleeve or indirectly heated type, are held in constant axial relation with respect to the other cooperating electrodes by multiple biasing spring members adjacent one end of the assembly. This construction provides an assembly in which mechanical instability is overcome, whereby the over-all noise level and plate current drift are materially decreased.

A feature of this construction pertains to the mounting of the cathode sleeve to insure positive biasing pressure thereon while permitting longitudinal controlled expansion in an axial direction. The cathodes are mounted axially in concentric relation to cooperating control and anode electrodes, between spacer discs. A bead is provided on one end of each cathode sleeve in contact with the portion of a disc adjacent an aperture through which the cathode extends, whereby the bead is in engagement with the spacer disc over a circumferential surface greater than 180 degrees and prevents motion of the cathode at this end of the assembly. At the other end of the assembly springs laterally bias the cathodes toward flat portions of apertures in the spacer at this end and additional springs engaging the cathodes impose longitudinal pressure thereon to maintain the beaded ends in contact with the spacer thereadjacent while permitting slight axial movement to allow for expansion and contraction due to temperature changes. Because the cathodes are of circular cross-section there is no tendency for the springs to cause rotation of the cathodes.

Another feature of the invention relates to the mounting of the biasing members at the top of the assembly to facilitate fabrication and control the pressure imposed on the cathode sleeves. This arrangement involves pairs of oppositely disposed clips which support the bowed springs in line with the cathodes, the springs engaging the cathode sleeves at intermediate points along the sides and over the tops thereof. The cathodes are thus confined by positive pressure to a definite position in the assembly so that noise and plate current shift due to vibration or shock are greatly reduced.

Another feature of the invention relates to the positive locking of the bowed springs in the assembly so that shifting which might lead to noise difficulties in operation is avoided. The pair of bowed springs associated with each cathode is rigidly clamped in a clip on one side of the cathodes and located in a rectangular slot in another clip on the opposite side of the cathodes. This insures positive location of the springs whereby the forces applied by the bowed springs localize the free ends thereof in definite positions in the anchor slots to prevent variation in spring position and pressure.

A further feature which aids in producing a noise free device relates to the method of mounting the control electrode or grid around each cathode of the device. The helical wound grid on parallel support wires is slightly twisted in the mounting assembly by offset holes in the top and bottom spacer discs so that the supports are held under strain. This prevents loose mounting of the grid so that noise caused by grid movement is reduced.

Another feature of the assembly which contributes to the reduction of noise is the effective shielding of the active zones of the triode units by the anodes completely enclosing the grids and cathodes between the spacer discs. This eliminates projection of electrons from the cathodes to the wall of the enclosing vessel where photoelectric activity may result in noise effects which result in instability in operation of the device.

These and other features and advantages of the invention will be more clearly set forth in the following detailed description when considered with the accompanying drawings in which.

Figure 1:
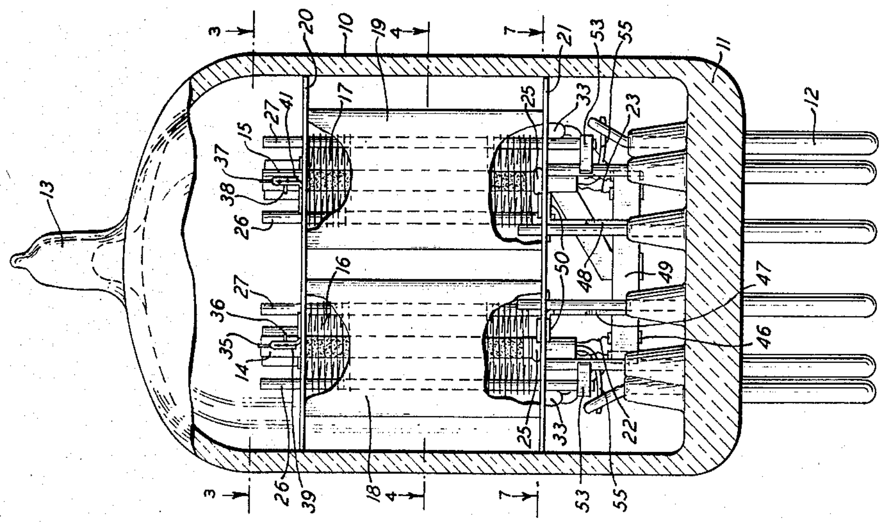
Fig. 1 is a view in elevation of a device illustrative of this invention with the enclosing vessel in cross-section and the electrode unit partially broken away to show the internal assembly.
Figure 7:
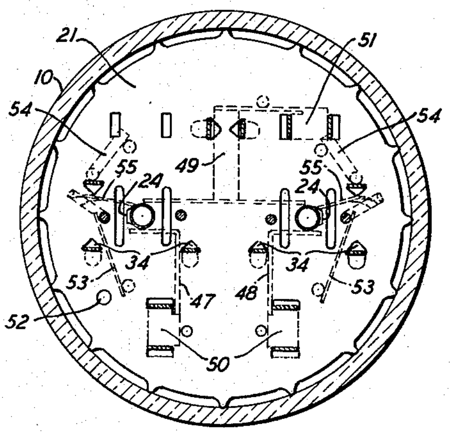
Figure 8:
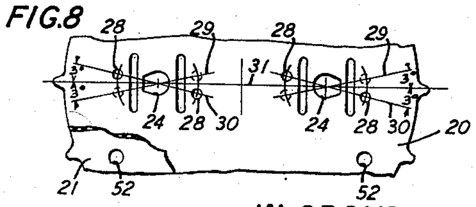

Fig. 7 is a plan view of the bottom spacer assembly taken on the line 7—7 of Fig. 1 and illustrating the connections of the various electrodes to the terminals in the stem of the device; and Fig. 8 shows, in an enlarged view, a segment of both spacer discs in transposed relation to indicate the mounting of the grids in offset holes in the discs in relation to the diametral line passing through the cathodes of the unit.

Figure 2:
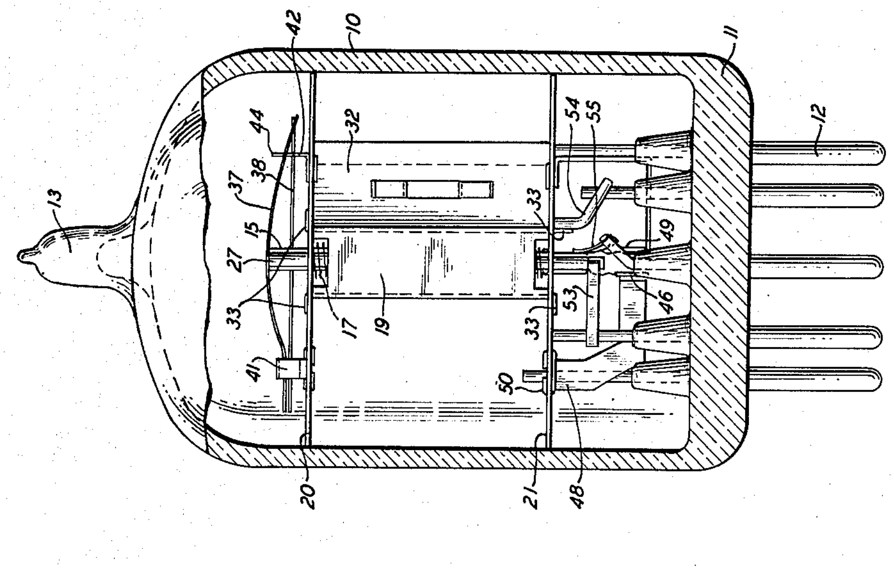
Fig. 2 is a similar view of the device of Fig. 1 but taken from a different angle to show the spring mounting at the top of the assembly.

Referring to the drawing and particularly to Figs. 1 and 2, the unitary electrode assembly is mounted in an enclosing vessel or casing 10 of cylindrical form sealed to the disc or flat stem 11 provided with a plurality of terminal pins or wires 12 mounted in parallel relation in a circular boundary. The vessel is evacuated to a low pressure through a sealing tip 13 at the top of the casing, and is then hermetically sealed.

The electrode unit, which for the purposes of illustration is shown as a twin triode, involves a pair of parallelly arranged groups of electrodes comprising a pair of tubular or sleeve cathodes 14 and 15, two control electrodes or grids 16 and 17, and two anodes or output electrodes 18 and 19. These electrodes are mounted between insulating, e. g. mica, spacer discs 20 and 21 which are designed to support the respective cathodes, grids and anodes of each group in concentric relation and the two groups in parallel relation in the vessel with the edges of the discs resiliently in contact with the cylindrical wall of the vessel. The respective groups of electrodes are joined to and supported by symmetrically spaced terminal pins in the stem on opposite halves thereof corresponding to the positions of the groups in the vessel. Thus, the cathodes, grids and anodes are individually connected externally through the pins 12 for applying suitable potentials to the various electrodes. In addition, the cathodes are provided with internal heater elements 22 and 23 of the hairpin helical type which are connected, through suitable coupling members, to three other terminal pins in the stem for connection of the heaters in series or parallel relation in the device.

The particular mounting assembly of the electrodes to attain the results heretofore indicated is shown in various construction details in Figs. 3 to 8, inclusive. The mounting of the parallel cathodes 14 and 15 is the first consideration in fabricating the unit assembly since motion of these components with respect to the surrounding electrodes, namely, the grids and anodes, must be accurately controlled. As one contributing factor in supporting the sleeve or cylindrical cathode in the spacer discs 20 and 21, these discs are provided with pairs of aligned irregular-shaped apertures 24, shown clearly in Figs. 3 and 8, having a substantially cylindrical configuration over an arc of approximately 240 degrees with a large angle wedge surface extending toward the outer edges of the discs. The cathode sleeves are also provided with formed beads 25 at the lower end so that these beads bear against the top rims of the apertures in the lower spacer disc 21. The significance of the irregular-shaped apertures in the spacing of the cathode sleeves will be explained later in the specification in relation to the pressure spring mounting of the cathodes.

The parallel cathodes are surrounded by helically wound grids 16 and 17 which are supported on pairs of side rods or wires 26 and 27, the wound grids having an elliptical configuration. These grids are securely held in the spacer discs so that vibration will not set up chatter noise during operation. This is effected by mounting the grids in a slightly twisted condition to apply lateral stress to the grids in the assembly. As shown in Fig. 8, the apertures 28 on opposite sides of each cathode aperture 24 are offset in opposite directions from a diameter across the disc by locating the apertures 28 on lines 29 and 30 passing through the centers of the cathode apertures 24 at angles of about 3 degrees on either side of the center line 31. It will be noted from the superimposed view of disc 20 on disc 21 in Fig. 8 that the pairs of grid apertures 28 in discs 20 and 21 in the vicinity of each cathode aperture 24 fall on alternate sides of the horizontal center line 31 with all holes displaced an equal distance from line 31. Since the grids 16 and 17 are normally wound on parallel supports the slight twist imparted to the grids when the supports are inserted in the offset apertures 28 in both spacer discs insures positive lateral force on the grids in the mounting assembly so that vibration or shock will not alter the relation of the grids to the spacer discs. The wound grids are gold-plated to overcome grid emission.

Figure 3:
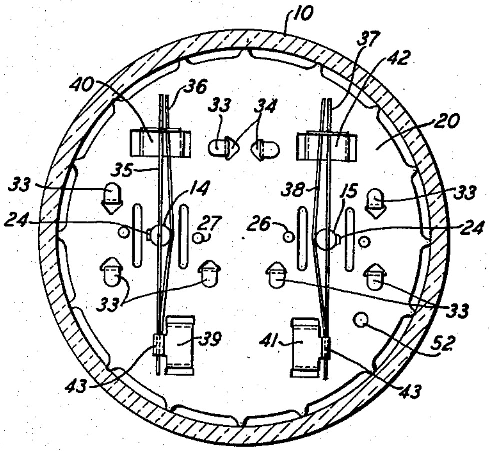
Fig. 3 is a plan view of the top structure of the unit, taken on the line 3—3 of Fig. 1.
Figure 4:
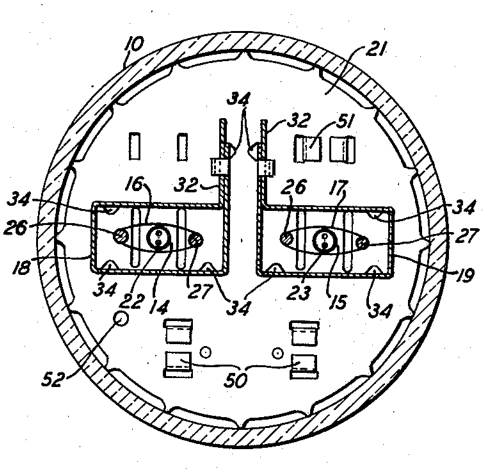
Fig. 4 is a view in cross-section of the device, taken on the line 4—4 of Fig. 1.

The anodes 18 and 19 are of heavy gauge nickel sheet, carbonized on both sides, which are formed into rectangular box-shaped enclosing electrodes with the joining ends locked together along one short dimension thereby to form heat radiating portions or fins 32. This construction increases the rigidity of the anodes and prevents buckling under high temperature conditions. The anodes are coated externally with zirconium in a suitable binder to provide a black body surface having gas-absorbing properties so that a separate getter substance is not required in the device. The top and bottom edges of the anodes and fins are provided with integral ears 33 which are aligned with the bases of a plurality of triangular apertures 34, as shown in Figs. 3 and 7, to rigidly secure the mica spacer discs thereto by bending over the ears after passing through the apertures and to substantially completely enclose the cathodes and grids, as shown in Fig. 4, with the long dimension of the anodes extending in alignment across one diameter of the discs and the fins in parallel relation adjacent an axial plane of the assembly.

In conventional electrode assemblies of this general type, uncontrolled movement of the cathode sleeve with respect to the spacing discs, and consequently the other electrodes, gives rise to noise and plate current shift. Such motion is materially controlled in accordance with this invention by regulated forces imposed on the cathodes both in lateral and axial directions by pairs of biasing springs bearing against the cathode sleeves to maintain them in constant position with respect to the other cooperating electrodes in the assembly. The construction to accomplish this result is shown more clearly in Figs. 3 and 5 wherein the pair of cathode sleeves 14 and 15 are positively biased in two directions by pairs of bowed springs 35 and 36 adjacent the top of sleeve 14, and 37 and 38 adjacent sleeve 15. These springs are preferably formed of tungsten wire. The lateral pressure force of bowed springs 36 and 38 against the projecting portions of the cathode sleeves 14 and 15 induces the cathodes to bear forcibly toward the outer wedge portions of the apertures 24 so that the cathodes will not readily move laterally in the assembly. The axial pressure springs 35 and 37 span the top edges of the respective cathode sleeves 14 and 15 to impose a downward controlled force which maintains the beads 25 on the cathodes, shown in Fig. 1, in contact with the lower spacer at apertures 24 but permit expansion and contraction of the cathodes due to temperature changes in operation. The round cross-sectional shape of the cathodes eliminates any tendency for the springs to cause rotation of the cathodes.

The bowed springs are held in their assigned positions by oppositely disposed pairs of metallic clips 39 and 40 for cathode sleeve 14 and 41 and 42 for cathode sleeve 15. The clips 39 and 41 extend through pairs of parallel slots located in transverse planes adjacent one edge of the top spacer disc 20, and are so located that upstanding flap portions 43, extending from the edges of the clips which are in line with the cathodes, clamp the ends of the springs extending through the flaps and rigidly hold them therein in superimposed relation, the springs 35 and 37 being uppermost in the clips to locatee the springs in proper relation to the cathode sleeves. Accordingly, the flap portions 43 of the clips are mounted in edgewise relation to the cathodes to direct the springs in alignment with the cathode sleeves.

Figure 5:
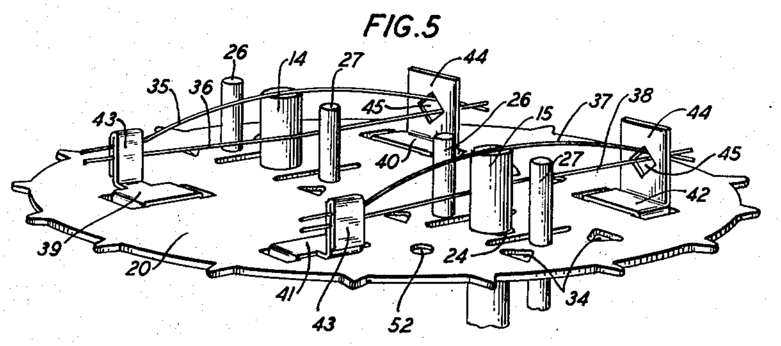
Fig. 5 is an enlarged perspective view of the top spacer assembly showing the relationship of the bowed springs and the cathodes associated therewith.
Figure 6:
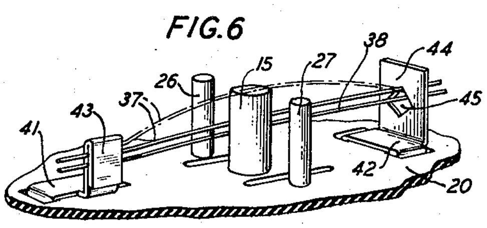
Fig. 6 is a partial view of the top spacer assembly of Fig. 5 showing the different positions of the axial pressure springs in the assembly.

The associated clips 40 and 42 are similarly mounted in pairs of slots near the periphery of the top disc 20. These slots are in parallel relation each pair being so located that upstanding portions 44 extending from the clips are presented in broadside or facing relation to the cathode sleeves. These perpendicular portions are provided with central diamond-shaped or square openings 45, as shown in Fig. 5 to locate the opposite ends of the bowed springs in definite positions with respect to the cathode sleeves. The bowed springs are initially placed in lateral contact with the cathode sleeves, as shown in Fig. 6. In this position the springs are located inside notches or corners of the diamond-shaped openings. After complete mounting of all the electrodes in the unit assembly the axial springs are raised by tweezers to their final position across the tops of the cathodes so that the free ends of the springs shift to the top notches or corners of the openings in the anchor clips. Therefore, the springs are definitely held in constant relation to the cathode sleeves to impose the required biasing pressure thereon. This arrangement insures constant control of the position of the cathode sleeves in the unitary assembly so that lateral movement is prevented and axial controlled movement is permitted only to the extent of expansion and contraction to prevent buckling due to temperature conditions. The positive pressure imposed on the cathode sleeves reduces chatter noise and anode current shift due to vibration or shock, thereby materially improving performance, particularly in direct current amplifier systems wherein anode current drift is especially objectionable.

Another feature of the invention which facilitates fabrication and contributes to the efficient handling and mounting of the assembly on the stem of the device relates to the association of the heater element connections to the unit prior to mounting the unit on the stem. The hairpin heater elements 22 and 23 are inserted into the cathode sleeves through the bottom of the unit. The projecting ends are provided with nickel sleeve tabs 46 to facilitate welding of the heater elements in the assembly. The heater terminations are secured to rigid connector arms in the unit prior to mounting the unit on the stem of the device so that rigid welded joints may be made on the heater elements.

The coupling of the heater elements to large surface connectors mounted on the unitary assembly is accomplished by providing a pair of angular-shaped arms 47 and 48 on one side of the cathode sleeve and a T-shaped common arm 49 on the other side, the ends of the arms terminating adjacent the cathode sleeves for welding the heater element terminations thereto. The arms 47 and 48 are attached to the lower spacer disc 21 by clip portions 50 which extend through pairs of slots in the spacer and the T-shaped arm is provided with an offset clip portion 51 which is secured to a similar pair of slots on the other half of the spacer, as shown in Figs. 4 and 7.

In the particular device shown in Figs. 1 and 2, the top and bottom mica spacer discs are identical with respect to the punching of the holes and slots therein for mounting the electrodes. However, to orient the discs so that the grids are mounted in twisted relation, a pair of discs is arranged by placing like faces in a plane side by side so that the grid holes are at uniform angles. Then by turning over one disc with respect to the other so that the grid holes lie in offset relation in the two discs they are ready for assembly of the clips and electrodes in the structural unit. This is expeditiously accomplished by providing index apertures 52 in the discs which, when placed as shown in Fig. 8, register the two discs in proper orientation for mounting the various electrodes in the assembly. In this relation, the bias spring clips will project upwardly from the top of the disc 20 while the heater connector clips will project downwardly from disc 21. When the electrodes are mounted between the discs, the biasing springs adjusted in relation to the cathode sleeves and the heater element terminations connected to the ends of the clips in the lower spacer, the grids will be twisted and securely held in position so the mount or unit is ready for assembly on the stem 11.

As shown in Figs. 1 and 2, the prepared stem with the terminal pins or wires thereon has the upper ends of the wires trimmed in a definite relation so that the front pair, as viewed in Fig. 1, is the longest, the adjacent pair on opposite sides thereof and the single wire furthest away from the long pins are of the height necessary to form a base support of the unit, and the anode and cathode wires are the shortest with the cathode leads being bent outwardly at a slight angle. The lower spacer disc 21 is also provided with a pair of apertures adjacent the angle clips 47 and 48 to receive the long pins or wires which register the unit in concentric relation on the stem 11. In this position, the lower spacer disc 21 rests on the tripod wires of equal length provided by the triangularly arranged grid and common heater terminal pins, the heater pin being in abutting relation to the T-shaped clip 49 in the unit, as shown in Fig. 2. This arrangement not only facilitates welding operations but insures rigidity in the mounting of the unit in the assembly. This may be realized at once by reference to Fig. 1 which shows the long pins alongside of the clips 47 and 48 so that welding these clips to the pins may be performed without difficulty to provide a large surface contact and positive weld area at the junction of these elements. Similarly, the T-shaped clip 49 adjacent the rear tripod wire has a portion in contact with the wire so that a permanent weld may be obtained between these components. The long support wires of the grids extend downwardly in parallel relation to the other tripod wires so that they may be connected by straps 53 which are suitably welded thereto.

In mounting the anodes in the assembly, one ear 33 at the lower end of the unit extends through the disc without being bent over so that a suitable stub wire 54 may be welded thereto and also to the short straight wires in the stem. Finally, flexible straps 55 on the cathode sleeves are welded to the bent pins in the stem. The lower clips coupling the heater elements to an external circuit provide a convenient assembly for connecting the heater elements in series or parallel relation depending on the voltage supply available or the current rating desired in the operation of the device. For example, with a suitable length and diameter of heater wire employed in the cathode sleeves two heater terminals may be used to connect the heaters to a 12.6-volt supply with the heaters in series through the common T-shaped connector or the heaters may be connected in multiple through the three terminals with a supply of 6.3 volts and double the current consumption of the series arrangement.

While the invention has been disclosed in a particular embodiment, it is, of course, understood that various modifications may be made in the detailed construction of the device shown without departing from the scope of the invention as defined in the appended claims.

What is claimed is:

1. An electron discharge device comprising an electrode mount including a sleeve cathode and spacer discs at opposite ends supporting said cathode, a pair of bowed spring members having intermediate portions engaging the side and end of said cathode, and anchoring clips on opposite sides of said cathode supporting said spring members on one of said spacer discs, one of said clips rigidly fixing one end of each of said spring members and the other having a retaining slot therein for said spring members.

2. An electron discharge device comprising an electrode mount including a sleeve cathode and spacer discs at opposite ends supporting said cathode, said spacer discs having apertures with flat portions through which said cathode extends, and a pair of bowed spring members on one of said spacer discs, one of said spring members having an intermediate portion forcing said cathode laterally toward flat portions of the nearest of said spacer discs and the other having a bridging portion forcing said cathode in an axial direction toward the other of said spacer discs.

3. An electron discharge device comprising a vessel, an electrode mount therein including a plurality of electrodes and spacer discs on opposite ends, one of said electrodes having a rigid portion projecting through one of said spacer discs, metallic clips mounted on said one spacer disc on opposite sides in relation to the rigid portion of said one electrode, and spring members extending between said clips and engaging the top and side of said rigid portion of said one electrode at an intermediate point.

4. An electron discharge device comprising an enclosing vessel having a stem, a unitary twin assembly of electrodes mounted on said stem including parallel tubular cathodes, grids and anodes, a pair of spacer discs on opposite ends for mounting said electrodes in triode units, connections between said electrodes and said stem, a pair of locking clips on one side of said cathodes, another pair of clips having slots therein on the other side of said cathodes, said clips being mounted on one of said spacer discs, and pairs of bowed wire springs extending between each locking clip and the related slotted clip, said pairs bearing against the sides and tops of the respective cathodes located between said clips.

5. An electron discharge device comprising an enclosing vessel having a stem, a twin unitary assembly of electrodes mounted on said stem including parallel tubular cathodes, grids and anodes, a pair of spacer discs on opposite ends for mounting said electrodes in separate triode units, connections between said electrodes and said stem, heater elements within said cathodes, a pair of locking clips on one side of said cathodes, another pair of clips having slots therein on the other side of said cathode, said clips being mounted on one of said spacer discs, pairs of bowed wire springs extending between each locking clip and the related slotted clip, said pairs bearing against the sides and tops of the respective cathodes located between said clips, a pair of angular clips and a T-shaped clip mounted on said other spacer disc, and connections between said heater elements and said latter clips.

6. An electron discharge device comprising an enclosing vessel having a stem, a twin unitary assembly of electrodes mounted on said stem including parallel tubular cathodes, grids and anodes, a pair of spacer discs on opposite ends for mounting said electrodes in separate triode units, and connections between said electrodes and said stem, said spacer discs having apertures on opposite sides of said cathodes positioned to mount said grids in a twisted condition between said discs to eliminate loose mounting of said grids therein.

7. An electron discharge device comprising an enclosing vessel having a stem, a unitary twin assembly of electrodes mounted on said stem including parallel tubular cathodes, grids and anodes, a pair of spacer discs on opposite ends for mounting said electrodes in triode units, and connections between said electrodes and said stem, said spacer discs having apertures on opposite sides of said cathodes offset from the plane through the axes of said cathodes the direction of offset being opposite at the two ends for mounting said grids in a twisted condition between said discs to eliminate loose mounting of said grids therein.

8. An electron discharge device comprising an enclosing vessel having a stem, a twin unitary assembly of electrodes mounted on said stem including parallel tubular cathodes, grids and anodes, top and bottom spacer discs on opposite ends for mounting said electrodes in separate triode units, connections between said electrodes and said stem, a pair of clips secured to said top spacer disc having a flap portion mounted edgewise with respect to said cathodes, another pair of clips having diamond-shaped slots mounted on said top disc with the slots facing said cathodes, and pairs of bowed wires extending between said clips, each pair having the ends adjacent the flap clips clamped therein, the opposite ends extending through said slots in the other clips and the intermediate portions bearing against the sides and tops of said tubular cathodes.

9. An electron discharge device comprising an enclosing vessel having a stem, a unitary twin assembly of electrodes mounted on said stem including parallel tubular cathodes, grids and anodes, top and bottom spacer discs on opposite ends for mounting said electrodes in separate triode units, connections between said electrodes and said stem, a pair of clips secured to said top spacer disc having a flap portion mounted edgewise with respect to said cathodes, another pair of clips having diamond-shaped slots mounted on said top spacer disc with the slots facing said cathodes, and pairs of bowed wires extending between said clips, each pair having the ends adjacent the flap clips rigidly fixed in superimposed relation therein, the opposite ends engaging side and top notches in said diamond-shaped slots and the intermediate portions in contact with the inner surfaces and tops of said tubular cathodes to exert outward and axial pressure on said cathodes.

WARREN GRONROS.
EDMUND A. VEAZIE.

REFERENCES CITED

The following references are of record in the file of this patent:

UNITED STATES PATENTS

| Number | Name | Date |
|---|---|---|
| 2,085,232 | Rothe | June 29, 1937 |
| 2,266,622 | Green | Dec. 16, 1941 |

FOREIGN PATENTS

| Number | Country | Date |
|---|---|---|
| 494,100 | Great Britain | Oct. 19, 1938 |